J. L. JENSEN.
DEMOUNTABLE RIM FOR AUTOMOBILE WHEELS.
APPLICATION FILED JAN. 10, 1918.
1,290,211.
Patented Jan. 7, 1919.
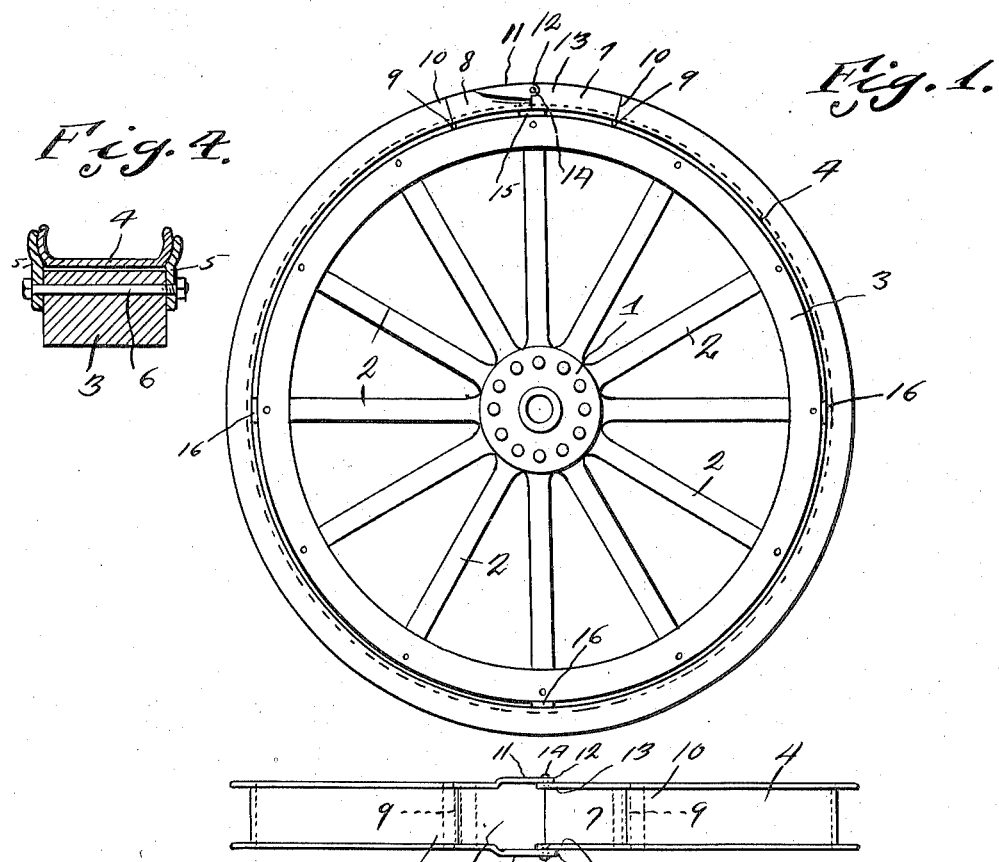
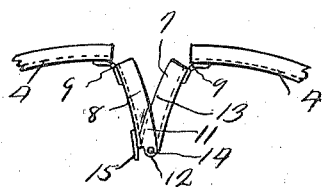
Inventor
J. L. Jensen
Witnesses

UNITED STATES PATENT OFFICE.

JAMES LAWRENCE JENSEN, OF COWLEY, WYOMING.

DEMOUNTABLE RIM FOR AUTOMOBILE-WHEELS.

1,290,211.  Specification of Letters Patent.  Patented Jan. 7, 1919.

Application filed January 10, 1918. Serial No. 211,198.

*To all whom it may concern:*

Be it known that I, JAMES L. JENSEN, a citizen of the United States, residing at Cowley, in the county of Bighorn, State of Wyoming, have invented a new and useful Demountable Rim for Automobile-Wheels; and I do hereby declare the following to be a full, clear, and exact description of the invention, such as will enable others skilled in the art to which it appertains to make and use the same.

This invention relates to an improved demountable rim for automobile wheels, and one of the objects of the invention is to provide a rim of this kind, and means whereby it may be easily and quickly demounted, and subsequently contracted for quick removal of the tire.

A further object of the invention is to provide a rim having a pair of hingedly connected sections concentric with the body of the rim and adapted to fold or collapse, after the rim is demounted from the felly of the wheel, to permit the removal of the tire.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of a wheel showing the demountable rim as applied thereto.

Fig. 2 is a plan view of the rim.

Fig. 3 is a detail view in elevation of a portion of the rim showing the pair of hinged sections folded or collapsed.

Fig. 4 is a detail sectional view through the felly and rim, showing how the rim is mounted upon the felly.

Referring more especially to the drawings 1 designates the hub of a wheel, 2 the spokes thereof, and 3 the felly. A rim 4 channel shaped in cross section is mounted upon the felly there being the conventional circular side rings or members 5 secured by the bolts 6 to the sides of the felly, for holding the rim against lateral movement on the felly. This rim 4 comprises the body, and 7 and 8 designate a pair of rim sections, which are connected by hinges 9 to the end portions 10 respectively of the rim body. These hinge connections are so arranged that the rim section may pivot inwardly. The side flanges of the rim section 8 are provided with laterally protruding offset portions 11, the ends 12 of which overlap the side faces of the flanges of the rim section or segment 7, and are pivoted to the side flanges 13 of said section 7 by the pivot pins 14. The bottom of the end portion (which is pivotally connected to the adjacent end portion of the section 7) of the section 8 is provided with an enlargement 15. This enlargement 15 underlaps the bottom of the section 7, to space the adjacent end portions of the sections 7 and 8 from the outer face of the felly, a distance equal to the thickness of the hinges 9, thereby holding the sections 7 and 8 truly concentric with the body of the rim and the felly of the wheel. The inner face of the rim at several other points is provided with enlargements 16, to engage the felly 3, thereby spacing the rim from the felly equal to the thickness of said hinges 9, thereby maintaining the rim concentric to the felly. In order to remove the tire, the circular rings 5 are first removed, then the rim may be slipped off the felly. The rim sections 7 and 8 may then be folded or collapsed inwardly, consequently contracting the rim after which the tire may be slipped over either one of the flanges of the rim.

The invention having been set forth what is claimed as new and useful:—

The combination with a demountable rim provided with a gap, of a pair of rim sections filling up and fitting said gap, connections between the rim sections and the ends of the rim body, the ends of the side flanges of one rim section engaging between the ends of the side flanges of the other rim section, the adjacent ends of the flanges of both sections being hingedly united, the side flanges of one rim section having depressions to permit the flanges of the other rim section to slide and engage therebetween, whereby the rim sections may fold or collapse inwardly, and means carried by the under part of one rim section and overlapping the adjacent rim section to limit the outward movement of said rim sections.

In testimony whereof I have signed my name to this specification in the presence of two subscribing witnesses.

JAMES LAWRENCE JENSEN.

Witnesses:
GEORGE THEDORE JENSEN,
MARSHALL S. MATHEWS.